United States Patent
Stafford et al.

(10) Patent No.: US 10,545,338 B2
(45) Date of Patent: *Jan. 28, 2020

(54) IMAGE RENDERING RESPONSIVE TO USER ACTIONS IN HEAD MOUNTED DISPLAY

(71) Applicant: Sony Interactive Entertainment Inc., Tokyo (JP)

(72) Inventors: Jeffrey Roger Stafford, Redwood City, CA (US); Xiadong Mao, San Mateo, CA (US); Glenn Black, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/900,759

(22) Filed: Feb. 20, 2018

(65) Prior Publication Data

US 2018/0188534 A1 Jul. 5, 2018

Related U.S. Application Data

(63) Continuation of application No. 14/206,849, filed on Mar. 12, 2014, now Pat. No. 9,897,805.
(Continued)

(51) Int. Cl.
*G02B 27/01* (2006.01)
*G02B 27/00* (2006.01)
(Continued)

(52) U.S. Cl.
CPC ............ *G02B 27/017* (2013.01); *A63F 13/10* (2013.01); *A63F 13/212* (2014.09);
(Continued)

(58) Field of Classification Search
CPC .................. G02B 27/017; G06F 3/012–014
See application file for complete search history.

(56) References Cited

U.S. PATENT DOCUMENTS

| 4,348,186 A | * | 9/1982 | Harvey | ............... G09B 9/307 |
| | | | | 434/44 |
| 5,442,734 A | | 8/1995 | Murakami et al. | ........... 395/127 |

(Continued)

FOREIGN PATENT DOCUMENTS

| JP | A-H06047170 | 2/1994 | ............... A63F 9/22 |
| JP | A-H06348253 | 12/1994 | ............... G09G 5/36 |

OTHER PUBLICATIONS

CN Application No. 201480032498.8, The First Office Action, PYD13860A, Dispatch No. 2018061501740010, Dispatch Date Jun. 21, 2018.
(Continued)

*Primary Examiner* — Hang Lin
(74) *Attorney, Agent, or Firm* — Penilla IP, APC

(57) ABSTRACT

Methods, systems, and computer programs are presented for rendering images on a head mounted display (HMD). One method includes operations for tracking, with one or more first cameras inside the HMD, the gaze of a user and for tracking motion of the HMD. The motion of the HMD is tracked by analyzing images of the HMD taken with a second camera that is not in the HMD. Further, the method includes an operation for predicting the motion of the gaze of the user based on the gaze and the motion of the HMD. Rendering policies for a plurality of regions, defined on a view rendered by the HMD, are determined based on the predicted motion of the gaze. The images are rendered on the view based on the rendering policies.

22 Claims, 9 Drawing Sheets

Related U.S. Application Data

(60) Provisional application No. 61/832,755, filed on Jun. 7, 2013.

(51) Int. Cl.
*A63F 13/40* (2014.01)
*G06F 3/01* (2006.01)
*A63F 13/212* (2014.01)
*G06F 3/038* (2013.01)

(52) U.S. Cl.
CPC ......... *G02B 27/0093* (2013.01); *G06F 3/013* (2013.01); *A63F 2300/105* (2013.01); *A63F 2300/1087* (2013.01); *A63F 2300/6661* (2013.01); *G02B 2027/014* (2013.01); *G02B 2027/0138* (2013.01); *G02B 2027/0187* (2013.01); *G06F 3/012* (2013.01); *G06F 3/038* (2013.01)

(56) References Cited

U.S. PATENT DOCUMENTS

| | | | |
|---|---|---|---|
| 7,395,031 B1 | 7/2008 | Ritter | 455/77 |
| 8,446,411 B2 | 5/2013 | Gerhard et al. | 345/428 |
| 8,655,015 B2 | 2/2014 | Nishimoto et al. | 382/103 |
| 9,665,171 B1* | 5/2017 | Skogo | G06F 3/013 |
| 9,690,099 B2* | 6/2017 | Bar-Zeev | G02B 27/017 |
| 2007/0049374 A1* | 3/2007 | Ikeda | A63F 13/06 463/30 |
| 2009/0225001 A1* | 9/2009 | Biocca | G02B 27/0172 345/8 |
| 2009/0305207 A1 | 12/2009 | Ueshima et al. | 434/258 |
| 2010/0017047 A1 | 1/2010 | Sanders-Reed | 701/3 |
| 2011/0304625 A1 | 12/2011 | Gerhard et al. | 345/428 |
| 2011/0306422 A1 | 12/2011 | Nishimoto et al. | 463/36 |
| 2012/0032874 A1* | 2/2012 | Mukawa | G02B 3/12 345/8 |
| 2012/0105473 A1 | 5/2012 | Bar-Zeev et al. | 345/633 |
| 2012/0106632 A1* | 5/2012 | Zhang | H04N 19/176 375/240.12 |
| 2012/0154536 A1* | 6/2012 | Stoker | H04N 5/2258 348/46 |
| 2013/0335405 A1* | 12/2013 | Scavezze | G06T 19/20 345/419 |

OTHER PUBLICATIONS

JP Application No. 2017-051072, Notice of Reason(s) for Refusal, Ref. F011-0026A, Dispatch No. 202332, Dispatch Date May 22, 2018.

EP 19 16 6648 European Search Report, The Hague, dated Oct. 4, 2019.

Schowengerdt et al., "3D Displays using Scanner Laser Projection", 47.4 / B.T. Schowengerdt, Dept. Mechanical Eng., University of Washington, Seattle, WA, USA.

* cited by examiner

Standard display scan

IMAGE RENDERING RESPONSIVE TO USER ACTIONS IN HEAD MOUNTED DISPLAY

CLAIM OF PRIORITY

This application is a continuation of U.S. patent application Ser. No. 14/206,849, filed Mar. 12, 2014, which claims priority from U.S. Provisional Patent Application No. 61/832,755, filed Jun. 7, 2013, and both entitled "IMAGE RENDERING RESPONSIVE TO USER ACTIONS IN HEAD MOUNTED DISPLAY," which is incorporated herein by reference.

BACKGROUND

1. Field of the Invention

The present embodiments relate to methods for improving the usability of Head Mounted Devices (HMD), and more particularly, methods, systems, and computer programs for rendering images on the display within the HMD.

2. Description of the Related Art

Typically, an HMD is a portable device worn around the head of the user, such that a display situated a short distance from the eyes provides images for user interaction. Some HMDs provide a mixed real-life and virtual life environments, where the user is able to see images created by a computing device, as well as some real-live images. Other HMDs provide immersive experiences that block the outside world to the user, while providing a virtual world on the HMD display.

However, there can be problems while the user views the real world or the virtual world through the display in the HMD because sometimes the computing capability of the HMD is not adequate to refresh images on the display. This can cause motion sickness to users of the HMD.

What is needed is an HMD that provides images that respond quickly to the motions of the user, and delivers a display quality sufficient to make the user have an immersive experience that feels the same way as if the user were looking into the real world.

It is in this context that embodiments arise.

SUMMARY

Methods, devices, systems, and computer programs are presented for rendering images on a head mounted display (HMD). It should be appreciated that the present embodiments can be implemented in numerous ways, such as a method, an apparatus, a system, a device, or a computer program on a computer readable medium. Several embodiments are described below.

In one embodiment, a method includes operations for tracking, with a gaze detection module inside the HMD, a gaze of the user of the HMD for generating gazed data, and for predicting, based on the gaze data, that the gaze of the user is to be directed toward a first region of the display of the HMD at a future time. The method also includes an operation for rendering the first region of the display with an image quality that is greater than that of regions away from the first region before the gaze of the user arrives at the first region.

In on embodiments, a method includes operations for tracking, with a gaze detection module, a gaze of a user of the HMD for generating gaze data and for accessing importance values for a plurality of virtual objects to the displayed by the HMD. The method also includes an operation for predicting, based on the gaze data and based on the importance values for the plurality of virtual objects, that the gaze of the user is to be directed toward a first region of the display at a future time. The method provides an operation for assigning rendering priority values for the plurality of virtual objects based on a proximity between each of the plurality of virtual object and the first region. Further, the method provides an operation for rendering, by the HMD, the plurality of virtual objects to the display according to the rendering priority values before the gaze of the user arrives at the first region.

In one embodiment, a computer program embedded in a non-transitory computer-readable storage medium, when executed by one or more processors for rendering images on a display of a head mounted display (HMD) is provided. The computer program in includes instructions for tracking, with a gaze detection module inside the HMD, a gaze of a user for generating gaze data, the tracking the gaze includes tracking movements of eyes of the user. The computer program further includes program instructions for predicting, based on the gaze data, that the gaze of the user is to be directed toward a first region of the display of the HMD at a future time. The computer program also provide program instructions for rendering the first region of the display with an image quality that is greater than that of regions away from the first region before the gaze of the user arrives at the first region.

In one embodiment, a method includes operations for tracking, with one or more first cameras inside the HMD, the gaze of a user and for tracking the motion of the HMD. The motion of the HMD is tracked by analyzing images of the HMD taken with a second camera that is not in the HMD. Further, the method includes an operation for predicting the motion of the gaze of the user based on the gaze and based on the motion of the HMD. Rendering policies for a plurality of regions, defined on a view rendered by the HMD, are determined based on the predicted motion or trajectory of the gaze. The images are rendered by the HMD based on the rendering policies.

In another embodiment, a computer program embedded in a non-transitory computer-readable storage medium, when executed by one or more processors, for rendering images on a head mounted display (HMD), is presented. The computer program includes program instructions for tracking, with one or more first cameras inside the HMD, the gaze of a user. Further, the computer program includes program instructions for tracking the motion of the HMD. Tracking the motion includes analyzing images of the HMD taken with a second camera that is not in the HMD. In addition, the computer program includes program instructions for predicting a motion of the gaze of the user based on the gaze and based on the motion of the HMD, and program instructions for determining rendering policies for a plurality of regions defined on a view rendered by the HMD based on the predicted motion of the gaze. The computer program further includes program instructions for rendering images by the HMD based on the rendering policies.

In yet another embodiment, a method, for rendering images on a head mounted display (HMD), includes an operation for tracking the gaze of a user wearing the HMD. In addition, the method includes an operation for assigning rending priority values for a plurality of game objects being rendered by the HMD based on the gaze of the user. The rendering priority value for each game object defines at least one of the frequency of rendering, complexity of rendering game object, image quality of game object, or the rendering resolution. Further yet, the method includes an operation for changing the rendering priority values based on an importance value of each game object in the game. The plurality of game objects are rendered by the HMD according to the rendering priority values.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

DETAILED DESCRIPTION

The following embodiments describe methods, apparatus, systems, and computer programs for rendering scenes on a Head Mounted Display (HMD). It will be apparent, that the present embodiments may be practiced without some or all of these specific details. In other instances, well known process operations have not been described in detail in order not to unnecessarily obscure the present embodiments.

Figure 1:
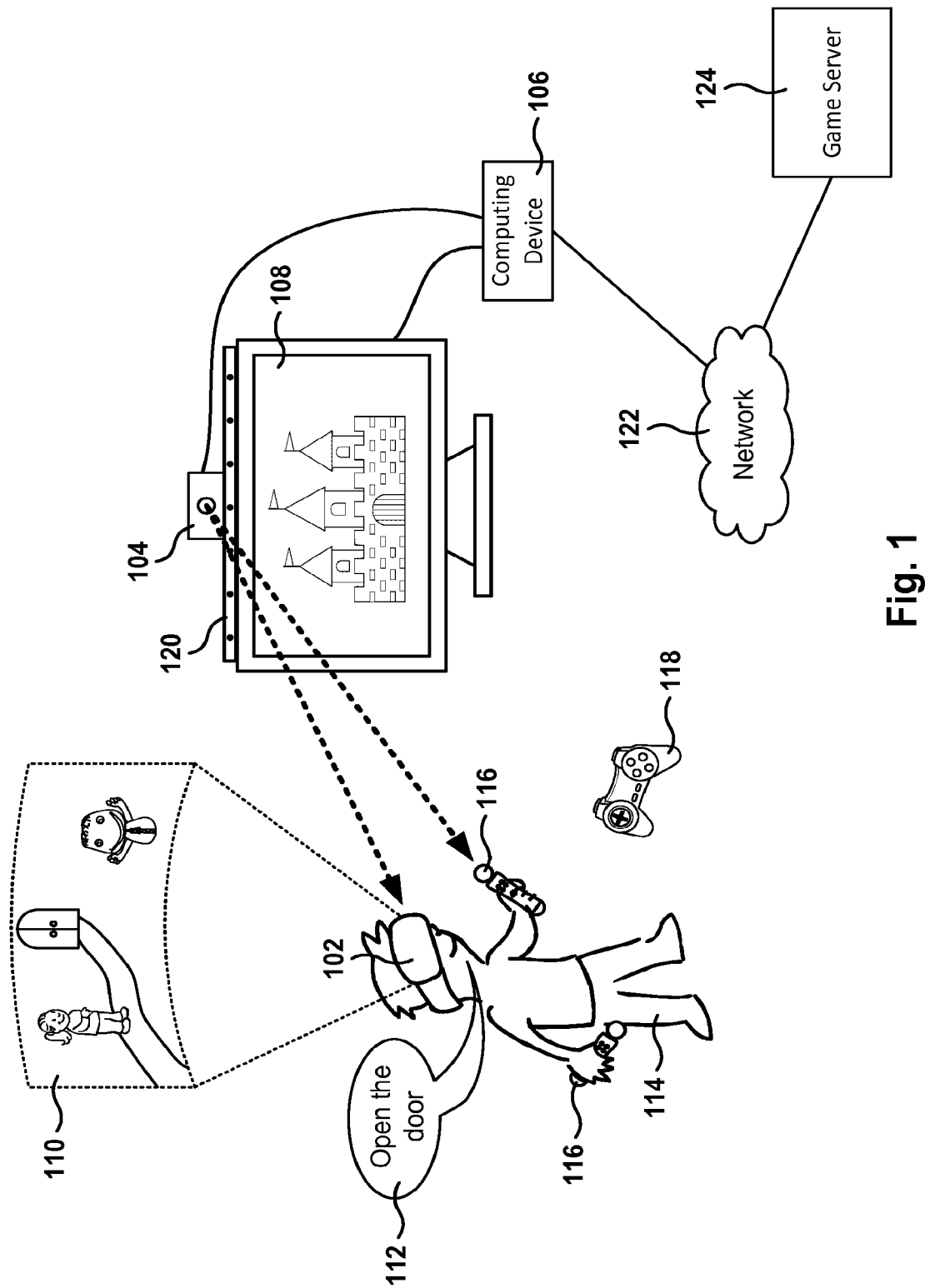
FIG. 1 illustrates a user interacting with a plurality of devices, including a Head Mounted Device (HMD), according to one embodiment.

FIG. 1 illustrates a user interacting with a plurality of devices, including a Head Mounted Device (HMD), according to one embodiment. User 114 is wearing HMD 102, which includes a display 110 that renders images near the eyes of the user. In one embodiment, the images are rendered in 3D.

Further, although embodiments presented herein are described with reference to a display on the HMD 102, other embodiments may use other view rendering methods, such as projecting an image on the retina of the user.

In one embodiment, computing device 106 executes a game that is displayed on the HMD 102. Therefore, computing device 106 cooperates with HMD 102 to display images for playing the game. The processing of game operations may be done on the computing device 106, on the HMD 102, or in both computing device 106 and HMD 102. In another embodiment, the processing of game operations is performed by a networked game server 124, or a cluster of remote game servers (not shown), which cooperate with computing device 106 and/or HMD 102 to display images for playing the game. In yet another embodiment, the HMD 102 cooperates with game server 124 for playing the game.

In the embodiment of FIG. 1, HMD 102 communicates wirelessly (e.g., WiFi, Bluetooth, etc.) with computing device 106. In other embodiments (not shown), HMD 102 may be wired directly to computing device 106, or in communication with computing device 106 via a network (e.g., the Internet). For example, computing device 106 may be a server on a network that provides game services. In some embodiments, the HMD is an autonomous game playing device and the game is executed directly on the HMD, without the need of an external device to run the game.

In one embodiment, a camera (or cameras) is coupled to computing device 106. If the computing device 106 is a server on a network, camera 104 may be a networked camera that sends images to the computing device via the network (e.g., via the Internet). Camera 104 may be one or more of a regular image camera, a stereo camera (i.e., with two or more lenses that capture images from the playing area), an infrared camera, a depth camera, a 3D camera, etc.

Images taken with camera 104 may be processed to track the location and movement of HMD 102. In addition, the images may also be used to track the location and motion of the user or a feature of the user (e.g., head of the user, mouth of the user, hands of the user, torso of the user, etc.), of a controller (e.g., one-handed controller 116, two-hand controller 118), or of any other element in the play area.

In one embodiment, the user may provide commands via voice recognition, which may be performed by computing device 106 via sound capture through one or more microphones 120, or may be performed by HMD 102 which also includes, in one embodiment, one or more microphones. In another embodiment, user 114 may also enter inputs via gestures that are analyzed and recognized by computing device 106.

In one embodiment, the computing device 106 is also connected to a display 108, which may perform some game operations. For example, display 108 may provide instructions to the user before the user puts on the HMD 102. In another embodiment, display 108 provides the same, or similar, display shown on the HMD so other players in the vicinity may perceive the progress of the user 114 on the game displayed on the HMD 102.

In one embodiment, the user holds one or more controllers 116. The computer device 106 tracks the location and movement of the controller, and operations related to the motion of the controller, or inputs entered with the controller, may be used as inputs for the game. For example, the controller may represent the handle of a sword, and the sword is displayed in the game scene. As the user moves the controller, the sword moves in the virtual world in synchronism with the controller. This way, the player is able to perform a fighting game operation where the sword is the weapon.

In one embodiment, the computing device 106 calculates a relative position between the HMD 102 and the game controller 116. The relative position is then used by the game to move a game object in synchronism with the HMD 102.

The computing device may also track a second controller 116, that may also be linked to a game object that is rendered on the display of the HMD. For example, the second controller may be a shield, and the user is able to fight with the sword and the shield in the virtual world. In other embodiments, the controller may be used in the game for other purposes, such as a weapon (e.g., a gun, a rifle or any type of firing weapon, an axe, a laser gun, a steering device—a steering wheel or handles of a motorcycle—a flashlight, a hammer, a shield, etc.

In another embodiment, the user may also interact with a two-handed controller, which may be used in similar fashion as the one-hand controller. For example, the two-handed controller may be used as a steering wheel.

In another embodiment, the inputs entered with the controller, such as by pressing buttons on the controller, may be used to perform commands in the game. For example, the user may use the buttons on the controller to move an avatar in the game, to fire a weapon, to grab an object, etc.

It is noted that the embodiments illustrated in FIG. 1 are exemplary. Other embodiments may utilize different devices, a different number of devices, have more or less interaction between the different devices, use other ways of communication (e.g. ultrasonic), facilitate a multiplayer game with two users wearing respective HMD's play the same game, etc. The embodiments illustrated in FIG. 1 should therefore not be interpreted to be exclusive or limiting, but rather exemplary or illustrative.

Figure 2:
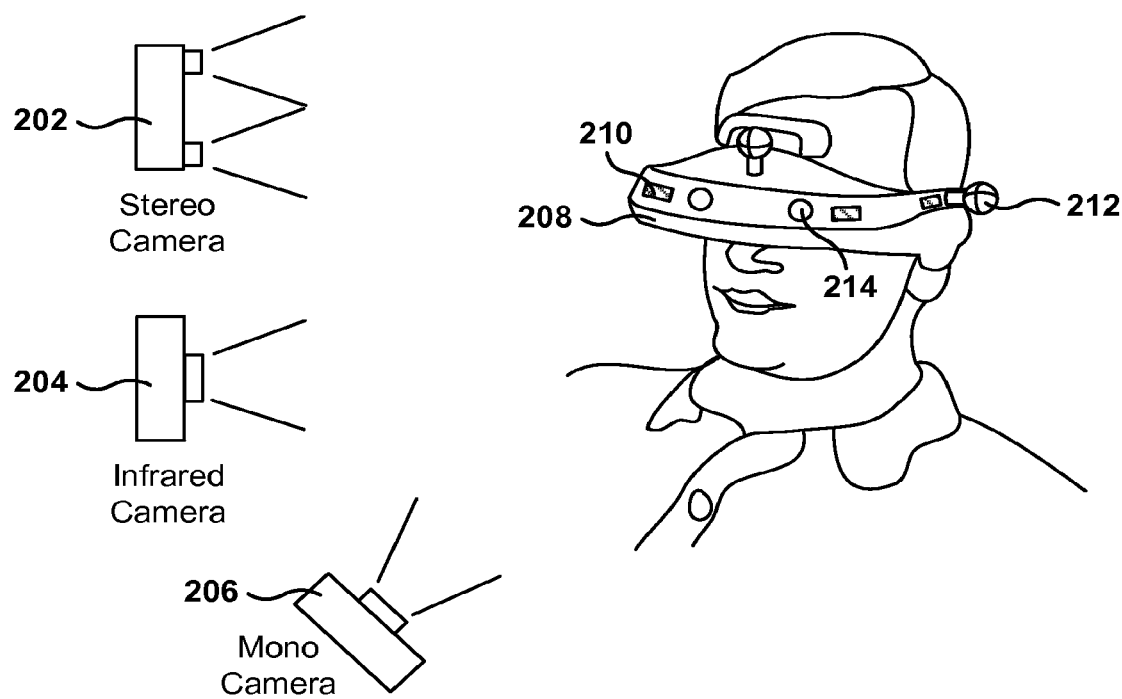
FIG. 2 illustrates the tracking of the HMD via image analysis, according to one embodiment.

FIG. 2 illustrates the tracking of the HMD via image analysis, according to one embodiment. In one embodiment, the HMD 208 includes elements that assist in the visual tracking of the HMD. For example, the HMD may include infrared lights 214, Light-Emitting Diodes (LED) 210, and objects with a special shape that is easily recognized via image analysis. For example, one or more spherical objects 212 may be added to the HMD for easy tracking. In addition, the spherical objects 212 may also be illuminated with LED light, infrared light, or any other type of illumination.

In addition, the HMD 208 may also include special visual markers (not shown), such as retro-reflective areas, areas with a particular color (e.g., blue rectangle, etc.), or markings (e.g., three parallel lines on the surface of the HMD), etc.

In some embodiments, the HMD includes lights or markers in the back of the HMD (i.e., the part of the HMD touching the back of the head). This way, if the user turns around and offers his back to the camera, it is still possible to visually track the location of the HMD by detecting the lights or markers in the back of the HMD.

The visual tracking of the HMD may be performed with different types of cameras. In one embodiment, the HMD is tracked with a stereo camera 202, which is a camera that includes two or more lenses. Images from the different lenses are compared in order to perform triangulation analysis of features in the HMD to assist in the location of the HMD, as well as in the calculation of the depth within the field of play of the HMD (e.g., distance from the HMD to the camera taking the pictures of the HMD).

In another embodiment, an infrared camera 204 analyzes infrared light (e.g., infrared lights 214). The infrared light is not visible to the human eye, but the infrared light is visible to the infrared camera. This way, the HMD may include infrared lights that do not detract from the appearance of the HMD. Additionally, in some environments (e.g., low light or bright light), it may be easier to track infrared light than other type of lights.

In yet another embodiment, a regular camera 206, also referred to herein as a mono camera because it has only one lens, is used to track the lights or features in the HMD. In order to determine the depth of the HMD within the field of play with the regular camera, the size of some of the features on the HMD are analyzed in order to detect the depth. The smaller the features are, the further away from the camera the HMD is. In addition, the tracking may also be combined with other types of tracking, such as inertial motion tracking, dead reckoning, ultrasound communication between the HMD in the computing device, etc.

It is noted that the embodiments illustrated in FIG. 2 are exemplary. Other embodiments may utilize different only one type of camera, several cameras in the field of play, etc. The embodiments illustrated in FIG. 2 should therefore not be interpreted to be exclusive or limiting, but rather exemplary or illustrative.

Figure 3:
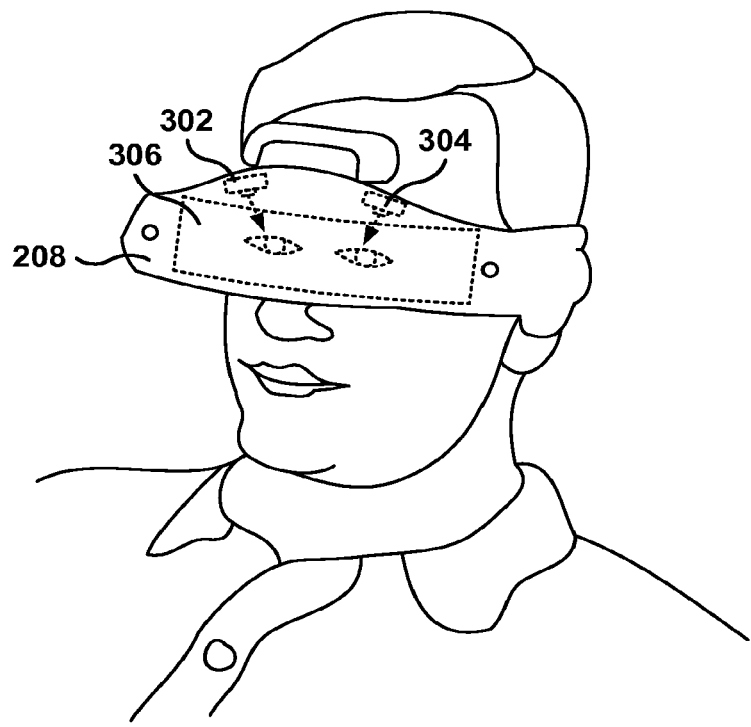
FIG. 3 shows an HMD with inside cameras for tracking the gaze of the user, according to one embodiment.

FIG. 3 shows an HMD 208 with inside cameras 302, 304 for tracking the gaze of the user, according to one embodiment. In one embodiment, the HMD 208 has one or more cameras (e.g. 302, 304) to track the gaze of the user, as the user is looking to the display 306 in HMD 208. In one embodiment, two cameras 302, 304, tracks the vision of the user, each camera tracking a different eye. In another embodiment, a single camera situated about the center of the HMD takes images of both eyes, and the images are analyzed to determine the gaze.

It is noted, that the embodiment of FIG. 3 includes cameras that are situated in front of the eyes, but the cameras may also be situated in different parts of the HMD. By using mirrors and filters, is possible to locate cameras for gaze tracking in multiple locations. For example, in one embodiment the camera may be situated behind the display, which lets the light go through in one direction (e.g., from the eye to the camera). In another embodiment, the camera may be situated on one side and aimed towards a mirror in the center of the HMD that redirects the vision of the camera towards the eyes.

Figure 4:
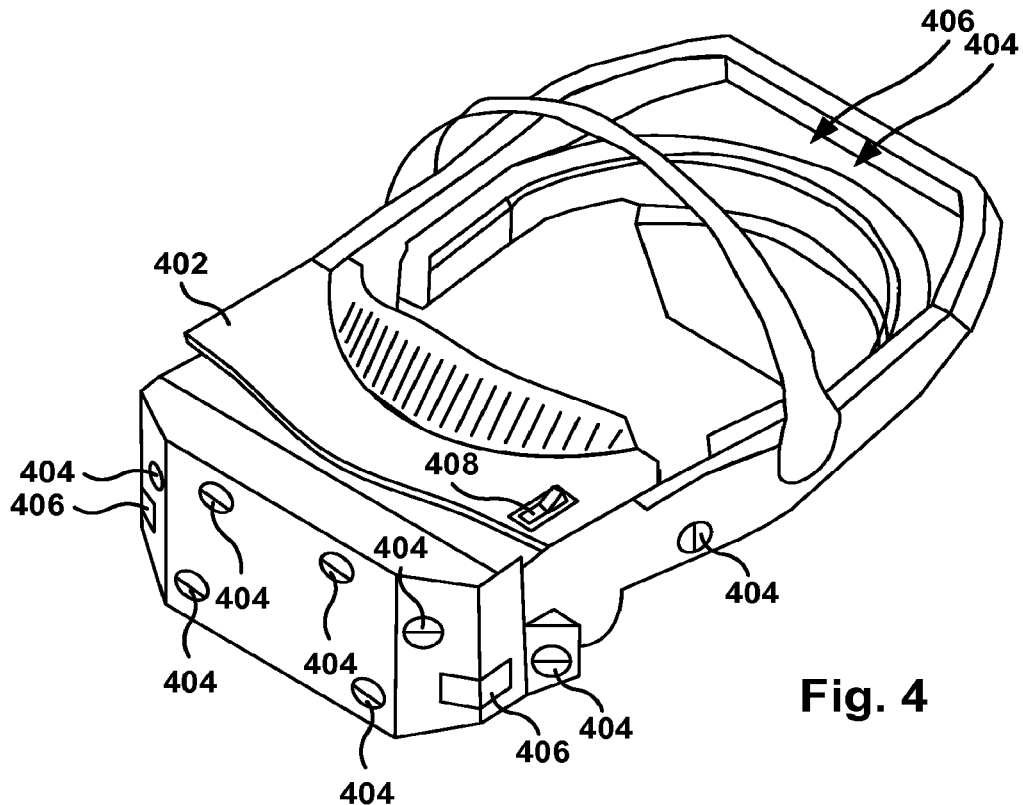
FIG. 4 shows an embodiment of an HMD with illumination points for visual tracking.

FIG. 4 shows an embodiment of an HMD with illumination points for visual tracking. FIG. 4 shows an HMD with a plurality of features that facilitate the tracking the motion of the HMD within the field of play. The HMD 402 includes infrared lights 404, which are situated in the front, sides, and back of the HMD.

The four infrared lights in the front of the HMD are situated on the same frontal plane of the HMD. In the embodiment of FIG. 4, the distance between the infrared lights of the top is a smaller than the distance between the infrared lights at the bottom. This way, the trapezoidal pattern formed by the infrared lights in the front facilitates the tracking of the HMD. For example, if the user tilts her head to one side, the trapezoid formed by the infrared lights in the front will be tilted the same angle as the head of the user.

In addition, three infrared lights on each side also assist with the tracking. Two of the side infrared lights are positioned at an angle between the front and the side of the HMD. Therefore, these two infrared lights may be seen by the camera when the camera is in front of the HMD or to the side of the HMD. Another infrared light on the side of the HMD is aimed towards the side of the head, or in other words, the infrared light is about 90° with reference to the infrared lights situated at the front of the HMD. Finally, an infrared light on the back of the HMD allows tracking of the HMD when the user is facing away from the camera.

As the user turns her head around, the infrared lights will form different patterns and the infrared lights will be perceived with different levels of brightness, based on the angle of view from the camera. These distances, size of the infrared lights, and levels of brightness, assist the computing device in the tracking of the location of the HMD.

In addition, the HMD includes three LED lights 406. There are two LED lights 406, situated at the front of the HMD, that have a cover that forms two intersecting planes. One of the planes is on the side of the HMD, and the other plane is at an angle (e.g., 45°) with reference to the front of the HMD. Similarly to the tracking of infrared lights, the computing device analyzes the shape and intensity of the LED light captured by the camera. This way, the computing device is able to determine the position of the HMD. Again, an LED light situated in the back of the HMD allows the camera to detect the HMD when the user is facing away from the camera.

It is noted that the embodiments illustrated in FIG. 4 are exemplary. Other embodiments may utilize different only one type of lights, more than one type of lights, different layouts for the lights, a different number of lights, etc. The embodiments illustrated in FIG. 4 should therefore not be interpreted to be exclusive or limiting, but rather exemplary or illustrative.

Figure 5:
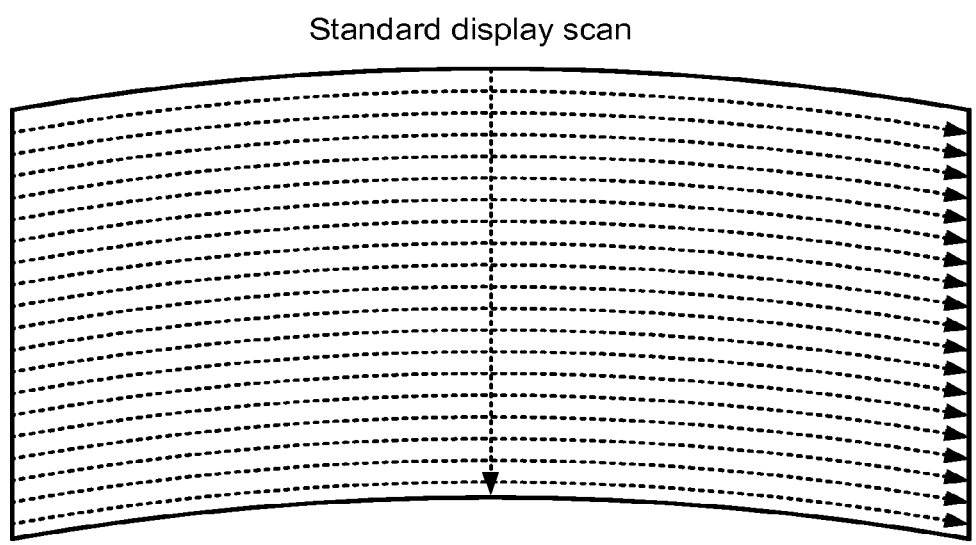
FIG. 5 illustrates the refreshing of the display, according to one embodiment.

FIG. 5 illustrates the refreshing of the display, according to one embodiment. In many displays, the content of the display is rendered, also referred to as scanned out or refreshed or updated, in lines. One line at a time is rendered, in order from top to bottom. Within each line, the pixels associated with the line are refreshed from left to right. This type of rendering gets the same refresh frequency for all the pixels on the display.

Embodiments presented herein define different regions within the display, and the pixels in each of the regions are given different rendering priority. The rendering priority determines how the pixels are displayed. In one embodiment, the higher the rendering priority for a pixel is the more frequent the pixel will be refreshed.

As used herein, a rendering policy for an identified region on the display determines how the identified region is scanned out. The rendering policy includes one or more values that identify how the region is to be displayed. In one embodiment, the rendering policy includes one or more of a frequency of screen updates for the region (e.g., 30 times a second, but other values are also possible), a rendering resolution, complexity of rendering imagery in the region, or a rendering order value.

The rendering resolution determines if all the pixels in a region will be refreshed individually. At the maximum resolution, (e.g., 100%) all the pixels in the region will be refreshed with individual values for color and brightness. However, sometimes the resolution of the region will be lowered (e.g., 64%) which means that only some of the pixels in the region are refreshed each pass. For example, at a rendering resolution of 50%, half of the pixels in the region will be refreshed in one cycle, and the other half will be refreshed in the next cycle.

The complexity of rendering imagery in the region is based on an amount of processing required to generate the pixel values for pixels in a region. For example, a background region with a uniform color, or a region that is filled with pixel values from a background image, will be less complex to render than a region that includes a moving avatar. Depending of some attributes of the avatar, the complexity may greatly increase, such as when the avatar includes long free-flowing hair, the avatar is an animal with fur, etc. Further, a region that includes a mirror may also have complex processing to determine the pixel values, as the image on the mirror will depend on the gaze of the user, and calculations may be needed to determine where the mirror is aiming.

In another embodiment, the definition of a region is changed by lowering the number of memory cells used to store pixel information. In this case, if the definition of a region is below the maximum, the memory used to store pixel data is reduced accordingly. For example, a region with a definition of 25% uses only 25% of the memory associated with 100% definition. This means that the same pixel data is used to scan groups of four pixels in the region.

In addition, the display technology can upscale the source memory associated with a region to fill the pixel region. In other embodiments, different methods for up-scaling or down-scaling may be used, such as nearest-neighbor interpolation, nearest-neighbor with mipmapping, bilinear filtering, trilinear filtering, or anisotropic filtering.

For example, bilinear filtering is a texture filtering method for smoothing textures when displaying a first plurality of pixels on an area of a display using a second plurality of pixels, where the number of pixels of the second plurality of pixels is different than the number of pixels in the first plurality of pixels. In other words, the second plurality of pixels requires a scaling (up or down) of the first plurality of pixels.

Many times, when drawing a textured shape on the screen, the texture is not displayed exactly as it is stored, without any distortion. Because of this, most pixels will end up needing to use a point on the texture that is between texels (unit of texture space), assuming the texels are points situated somewhere in their respective cells. Bilinear filtering uses these points to perform bilinear interpolation between the four texels nearest to the point that the pixel represents (in the middle or upper left of the pixel, usually).

By lowering the resolution or the definition in one region, computing resources may be allocated to other regions on the screen that are more critical to provide a better experience for the user.

The rendering order value is a value assigned by the computing device to define the order in which the regions are rendered. In one embodiment, the computing device provides a rendering order value to each of the regions, and then all the regions are scanned out in the order defined by the rendering order value. In other words, the computing device creates a sorted list of all the regions for rendering.

In one embodiment, one or more rendering rules define the rendering policy. For example, the rendering policy may include one rule (e.g., display pixels from left to right and from top to bottom), or may include two or more rules. For example, a first rule may define that regions in the center of the display will have higher priority than regions in the periphery of the display, and a second rule may define that regions with game characters have a higher rendering priority that regions without game characters.

Figure 6:
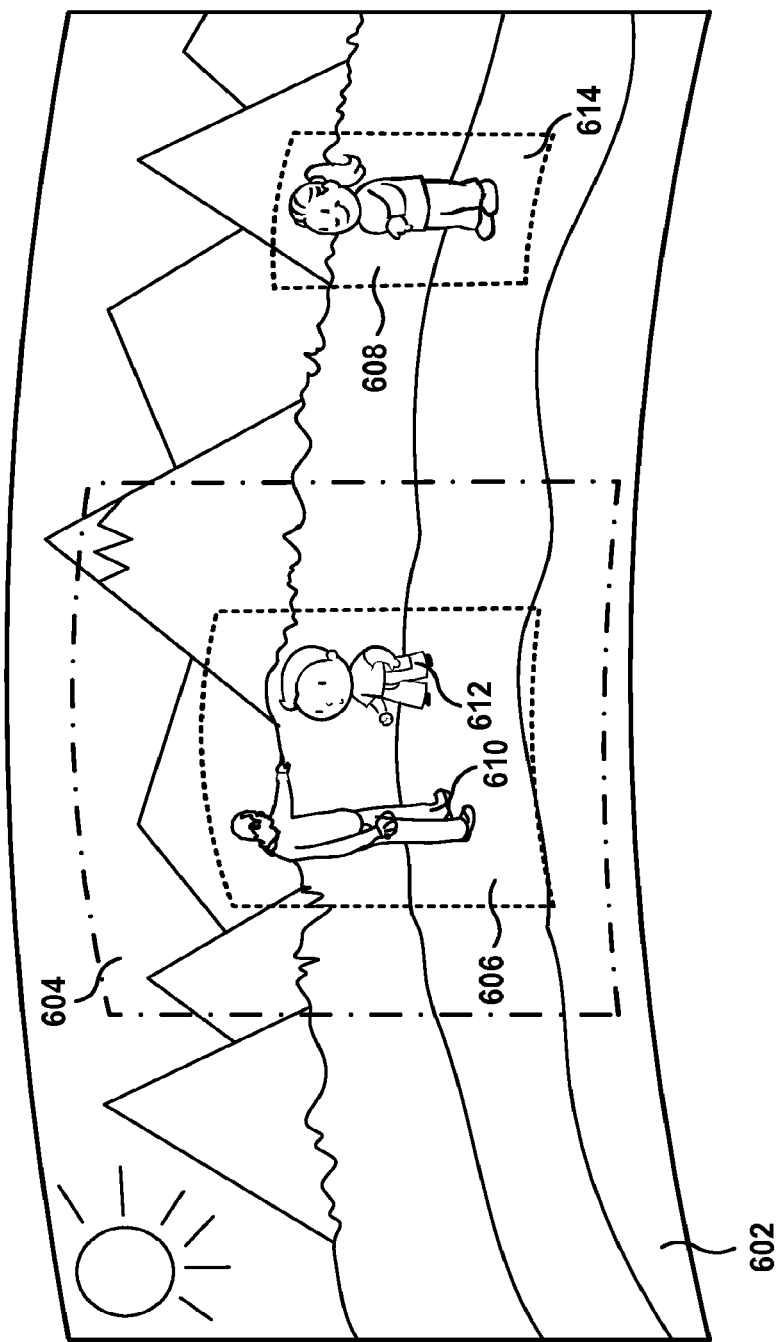
FIG. 6 illustrates a game scene shown on the display of the HMD, according to one embodiment.

FIG. 6 illustrates a game scene shown on the display of an HMD, according to one embodiment. In some embodiments, gaze tracking and HMD motion tracking are used to prioritize the scanning out of different regions on the HMD display 602.

In one embodiment, the screen is partitioned into a plurality of regions or sections, and the regions are updated with different priorities and with different levels of resolution. This means that some regions may be refreshed more frequently than others or with a higher resolution.

The HMD tracking assists in determining where the user is going to project their gaze, because when the user is going to change their gaze there is a natural instinct to move the head in the same direction, even though the movement of the head may be slight when compared to the movement of the eyes. For example, if a user is looking straight ahead and the head (together with the HMD) starts moving towards the left, the computing device projects that the user is going to move their gaze to the left. In response to this detection, the areas on the left of the screen are rendered with higher priority than the areas on the right side of the screen. In fact, it is very probable that the areas towards the right border of the screen will disappear from view as the scene shifts towards the left.

By prioritizing the scanning out of the different regions, it is possible to give a better experience to the user by focusing on where the user is looking, or where the user is going to look next, and more efficiently applying computer resources to enable rendering the user's view faster and with better quality.

HMD motion tracking is important, because sometimes it is faster to detect HMD motion than gaze motion. In some cases, the computing device tracking visually the HMD has more computing resources than the HMD, so the computing device is able to detect the HMD motion and predict a trajectory of the HMD based on the HMD motions. Additionally, the HMD provides information to the computing device regarding the current location of the gaze, and the computing device is able to combine both sources of information in order to better predict the trajectory of the gaze.

FIG. 6 shows a screen of a virtual reality game. Embodiments presented herein are described with reference to virtual reality displays, where the screen shows exclusively scenes created by a computing device. However, the principles presented herein may also be applied to augmented reality games, where the view on the screen is a combination of real-world images and computing-device generated images. In one embodiment, the game is played on an extensive virtual world. The user sees only a part of the virtual world at any time, and the user is able to move around the virtual world. As the user moves around the virtual world, other parts of the virtual world are exposed.

In some embodiments, the current user's viewpoint 604 is given a higher rendering priority than regions outside the user's viewpoint 604. The user's viewpoint is defined as an area on the display where the user is focusing its view. Therefore, most of the game interactions occur within the user's viewpoint 604. Of course, the gaze of the user is centered around the viewpoint 604.

Many people are able to see within their field of view an area that goes from about 90° to the left to about 90° to the right. However, the areas on the periphery of the user's vision are not perceived clearly, although a person may feel some motion or changes within those periphery areas.

In the embodiment shown in FIG. 6, the viewpoint is defined as a rectangular section on the screen, where the gaze of the user is centered within this rectangular section. However, other types of viewpoint areas may be defined. For example, in one embodiment the viewpoint area is defined as a circle around the gaze point of the user on the screen. A viewing angle is defined with reference to a line from the midpoint between the eyes to the gaze point on the screen. The radius of the viewpoint circle is then determined by the viewing angle. In some embodiments, the viewing angle may have values in the range of 5° to 45°, but other values are also possible.

In some embodiments, the rendering policy requires that regions with game characters are given higher rendering priority that regions without game characters. In other embodiments, another rendering policy gives higher scan out priority to game characters and special game objects ranked as important game objects by the game. For example, an important game object may be an exit door, a navigation console in a car or plane, a target on a soothing game, an enemy aircraft, etc. In general, an important game object is an object that can be acted upon by the user, while non-important game objects are rendered in the background to fill out the scene.

In FIG. 6, region 606 (including game characters 610 and 612) and region 608 (including game character 614) are regions with game characters and are given a higher rendering priority than the rest of the display. Of course, in some embodiments this is only a factor in calculating the final rendering priority, as the rendering priority may be altered by some other rules, such as when the user is moving their gaze or their head.

In one embodiment, blurring on the screen may occur when the user moves their head fast because the fast motion requires a fast update of the display, and the HMD may not have enough computing resources to keep up with the motion of the user. In order to avoid blurring while the HMD is in fast motion, the rendering policies start refreshing faster the regions associated with the motion of the user, and some other the regions might be refreshed at lower frequency or with lower resolution. Once the HMD stops moving, the higher quality of the scanned out image is restored.

Further, it is noted that in order to predict the trajectory of the gaze of the user, the computing device tracks the trajectory of the gaze of the user over a predetermined period of time, and also tracks the trajectory of the HMD over the predetermined period of time (or some other period to time). The historical data is used to predict the trajectory of the gaze of the user by analyzing the trend in the gaze motion and in the HMD motion.

It is noted that the embodiments illustrated in FIG. 6 are exemplary. Other embodiments may utilize different types of viewpoint areas, different types of displays, different rendering policies, etc. The embodiments illustrated in FIG. 6 should therefore not be interpreted to be exclusive or limiting, but rather exemplary or illustrative.

Figure 7:
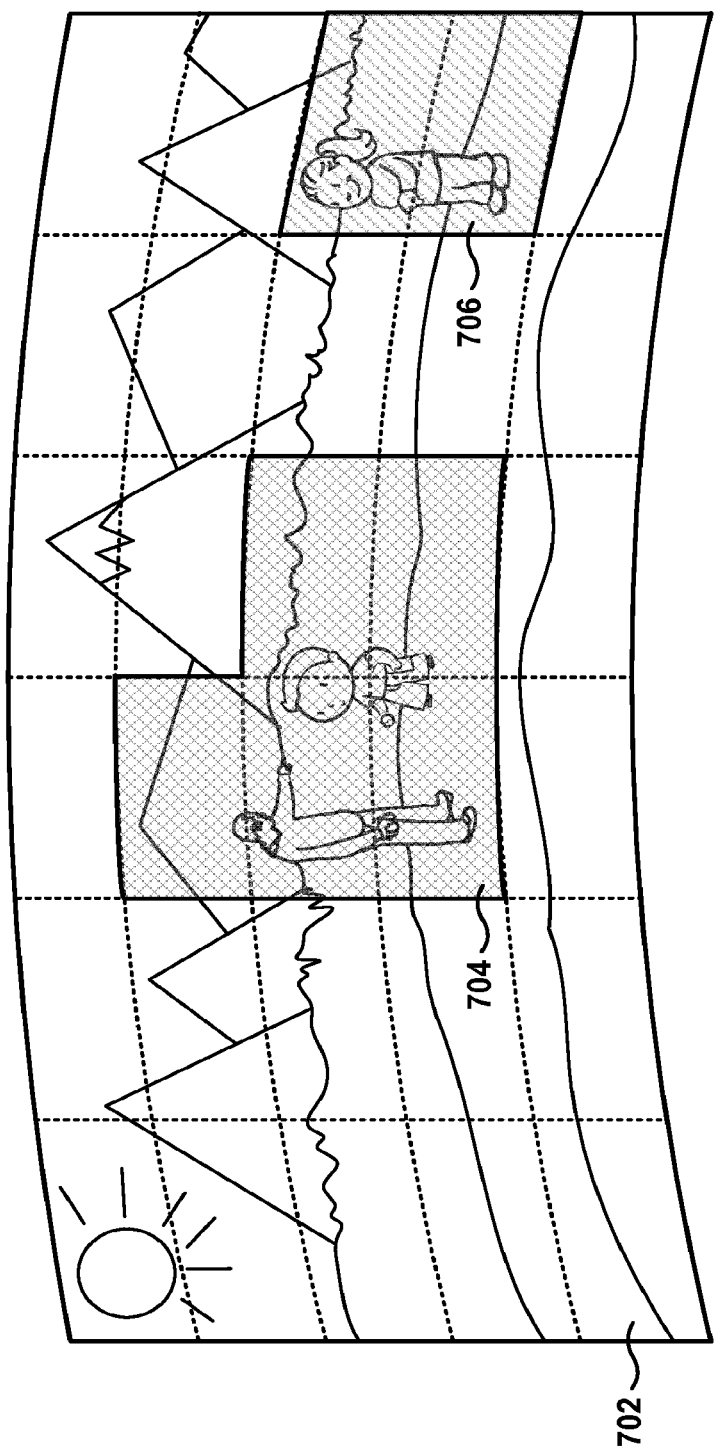
FIG. 7 illustrates the creation of regions in the display for prioritized rendering, according to one embodiment.

FIG. 7 illustrates the creation of regions in the display for prioritized rendering, according to one embodiment. In the embodiment of FIG. 7, a plurality of regions of equal size is defined on the screen 702. In the exemplary embodiment, a grid is defined on the screen that creates 30 regions (6×5). In other embodiments, the regions defined on the screen do not have equal size. For example, the regions on the center of the display are smaller than the regions on the outside of the display, as typically the regions on the center are more important to provide a better user experience. Consequently, these center regions are given higher rendering priorities.

In some embodiments, some of the regions are given a higher priority for rendering based on game activities or based on what the user is doing. For example, as discussed above with reference to FIG. 6, motions of the head of the user are detected and used to increase the priority of the regions where the gaze of the user is predicted to be.

In one embodiment, regions with game characters are given higher priority than regions without game character. In the exemplary embodiment of FIG. 7, the regions inside areas 704 and 706 include parts of game characters. In one embodiment, the rendering policy includes a rule that increases the priority for rendering of regions 704 and 706. Another rendering policy gives high rendering priority to regions in the center of the screen and low rendering priority to regions in the periphery of the display.

In one embodiment, the rendering policy for each region is calculated by considering a plurality of factors or rules that determine the priority. The following equation is used to determine the rendering policy rp value for region $r_i$:

$$rp(r_i) = f(\text{rule}_1(r_i), \text{rule}_2(r_i), \ldots, \text{rule}_n(r_i))$$

Where $rp(r_i)$ is the rendering policy for region $r_i$, and $\text{rule}_1$-$\text{rule}_n$ are the policy rules defined for determining the rendering policy. For example, one rule may dictate the regions in the center of the display are given higher rendering priority, a second rule may determine that regions with game characters are given higher rendering priority, a third rule may give higher priority to a region around the point of gaze, a fourth rule may determine that when the user is moving their head the regions where the head is predicted to turn are given higher rendering priorities, etc.

In one embodiment, the rendering policy includes one or more of a frequency of screen updates for the region, a rendering resolution, and a rendering order value. In one embodiment, each rule is given a weight in order to calculate the rendering policy for the region. In some embodiments, the weights may be dynamically adjusted based on past experience.

Figure 8:
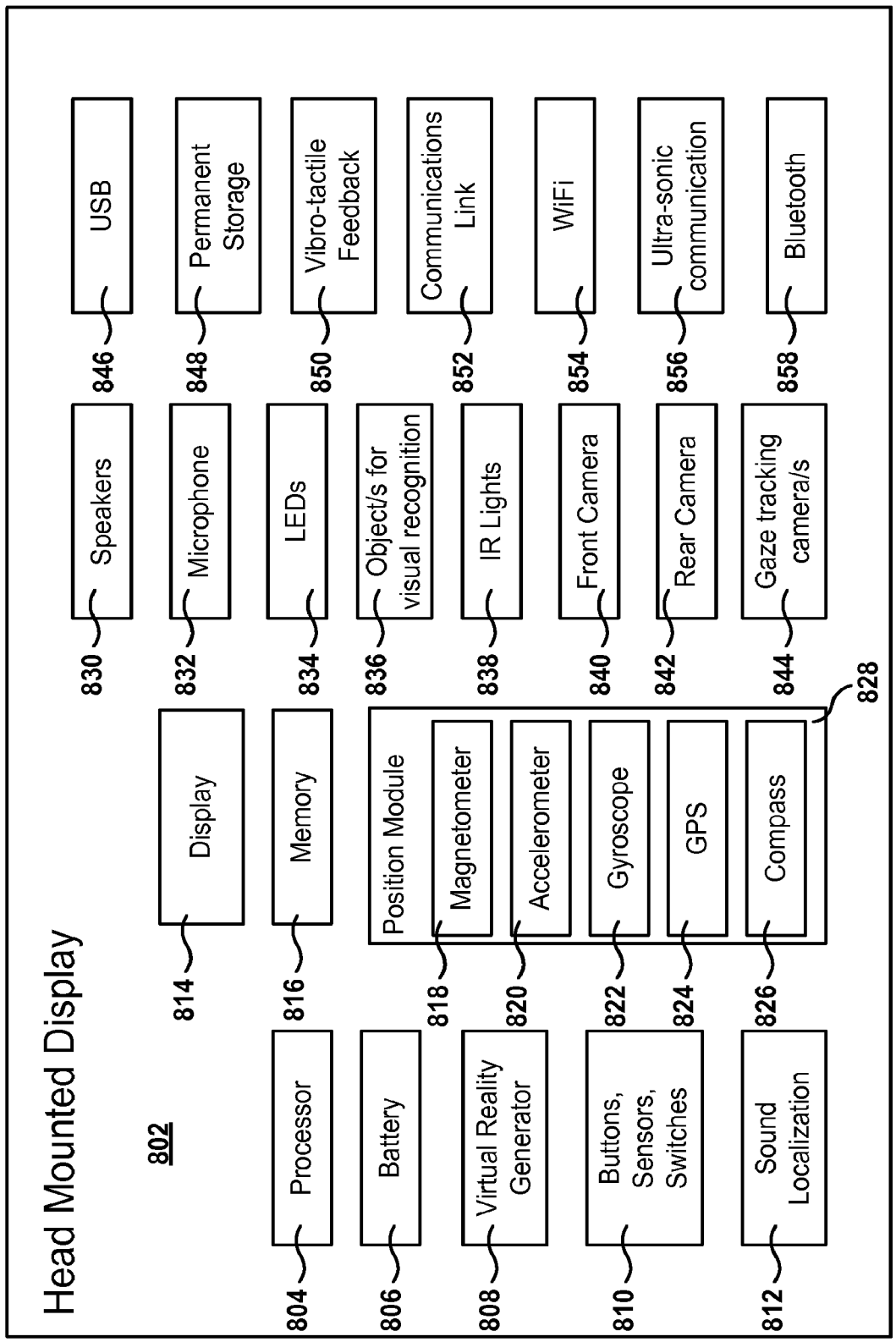
FIG. 8 illustrates the architecture of a device that may be used to implement embodiments of the invention.

FIG. 8 illustrates the architecture of a device that may be used to implement embodiments of the invention. The head mounted display is a computing device and includes modules usually found on a computing device, such as a processor 804, memory 816 (RAM, ROM, etc.), one or more batteries 806 or other power sources, and permanent storage 848 (such as a hard disk).

The communication modules allow the HMD to exchange information with other portable devices, other computers, other HMD's, servers, etc. The communication modules include a Universal Serial Bus (USB) connector 846, a communications link 852 (such as Ethernet), ultrasonic communication 856, Bluetooth 858, and WiFi 854.

The user interface includes modules for input and output. The input modules include input buttons, sensors and switches 810, microphone 832, touch sensitive screen (not shown, that may be used to configure or initialize the HMD), front camera 840, rear camera 842, gaze tracking cameras 844. Other input/output devices, such as a keyboard or a mouse, can also be connected to the portable device via communications link, such as USB or Bluetooth.

The output modules include the display 814 for rendering images in front of the user's eyes. Some embodiments may include one display, two displays (one for each eye), micro projectors, or other display technologies. Other output modules include Light-Emitting Diodes (LED) 834 (which may also be used for visual tracking of the HMD), vibro-tactile feedback 850, speakers 830, and sound localization module 812, which performs sound localization for sounds to be delivered to speakers or headphones. Other output devices, such as headphones, can also connect to the HMD via the communication modules.

The elements that may be included to facilitate motion tracking include LEDs 834, one or more objects for visual recognition 836, and infrared lights 838.

Information from different devices can be used by the Position Module 828 to calculate the position of the HMD. These modules include a magnetometer 818, an accelerometer 820, a gyroscope 822, a Global Positioning System (GPS) module 824, and a compass 826. Additionally, the Position Module can analyze sound or image data captured with the cameras and the microphone to calculate the position. Further yet, the Position Module can perform tests to determine the position of the portable device or the position of other devices in the vicinity, such as WiFi ping test or ultrasound tests.

A Virtual Reality Generator 808 creates the virtual or augmented reality, as previously described, using the position calculated by the Position Module. The virtual reality generator 808 may cooperate with other computing devices (e.g., game console, Internet server, etc.) to generate images for the display module 814. The remote devices may send screen updates or instructions for creating game objects on the screen.

It should be appreciated that the embodiment illustrated in FIG. 8 is an exemplary implementation of a portable device. Other embodiments may utilize different modules, a subset of the modules, or assign related tasks to different modules. The embodiment illustrated in FIG. 8 should therefore not be interpreted to be exclusive or limiting, but rather exemplary or illustrative.

Figure 9:
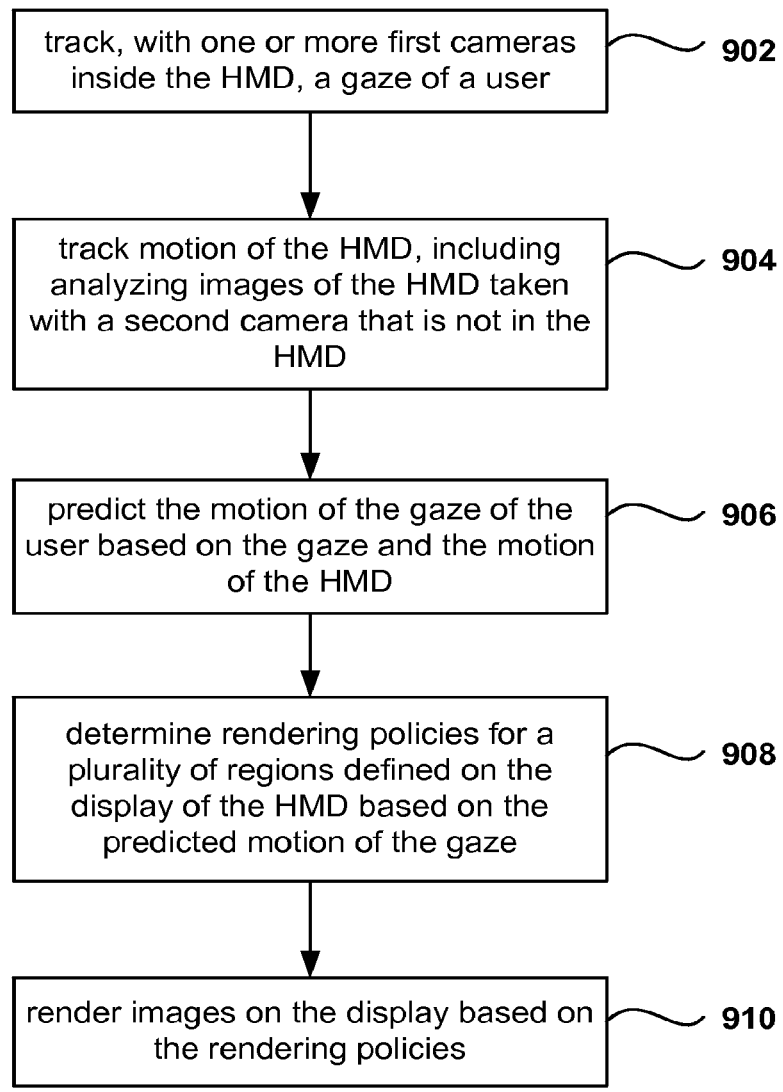
FIG. 9 is a flowchart for rendering images on the HMD, according to one embodiment.

FIG. 9 is a flowchart for rendering images on the HMD, according to one embodiment. While the various operations in this flowchart are presented and described sequentially, one of ordinary skill will appreciate that some or all of the operations may be executed in a different order, be combined or omitted, or be executed in parallel.

In operation 902, the method tracks, with one or more first cameras inside the HMD, the gaze of the user. From operation 902, the method flows to operation 904 where the method tracks the motion of the HMD. Tracking the motion includes analyzing images of the HMD taken with a second camera that is not in the HMD (e.g., camera 104 in FIG. 1).

From operation 904, the method flows to operation 906 where the motion of the gaze of the user is predicted (e.g., the predicted trajectory of the gaze) based on the gaze and the motion of the HMD. Further, from operation 906 the method flows to operation 908 where rendering policies for a plurality of regions defined on the display of HMD are determined. The rendering policies are determined based on the predicted motion of the gaze.

From operation 908, the method flows to operation 910 to render images on the display based on the rendering policies previously calculated. In addition, in one embodiment the rendering resolution for a region is decreased when the HMD is moving, and the rendering resolution of the region is increased when the HMD becomes stationary.

In some implementations, inertial information is received regarding the motion of the HMD, the inertial information being captured by inertial sensors in the HMD. In another embodiment, the motion of HMD is tracked by analyzing images of the HMD taken with a second camera that is not in the HMD. In yet another embodiment, the motion of the HMD is tracked by combining inertial information with results from the image analysis of images taken with the second camera.

In yet another embodiment, a method for rendering images on a HMD is presented. The method includes an operation for tracking the gaze of a user looking at the view created by a display inside the HMD. Further, the method includes an operation for assigning rending priority values for a plurality of game objects being rendered on the display based on the gaze of the user. The rendering priority value for each game object defines the frequency of rendering and the rendering resolution. In addition, the method includes an operation for changing the rendering priority values based on an importance value of each game object in the game. In another operation, the method renders the plurality of game objects on the display according to the rendering priority values.

In another embodiment, the actual source imagery is altered based and the source imagery and the region where the source imagery is being rendered. For example, a game character is rendered with more detail when the game character is under direct gaze (e.g., the game character is near the center of the user's field of view) than when the game character is not under direct gaze (e.g., the game character is not near the center of the user's field of view).

Figure 10:
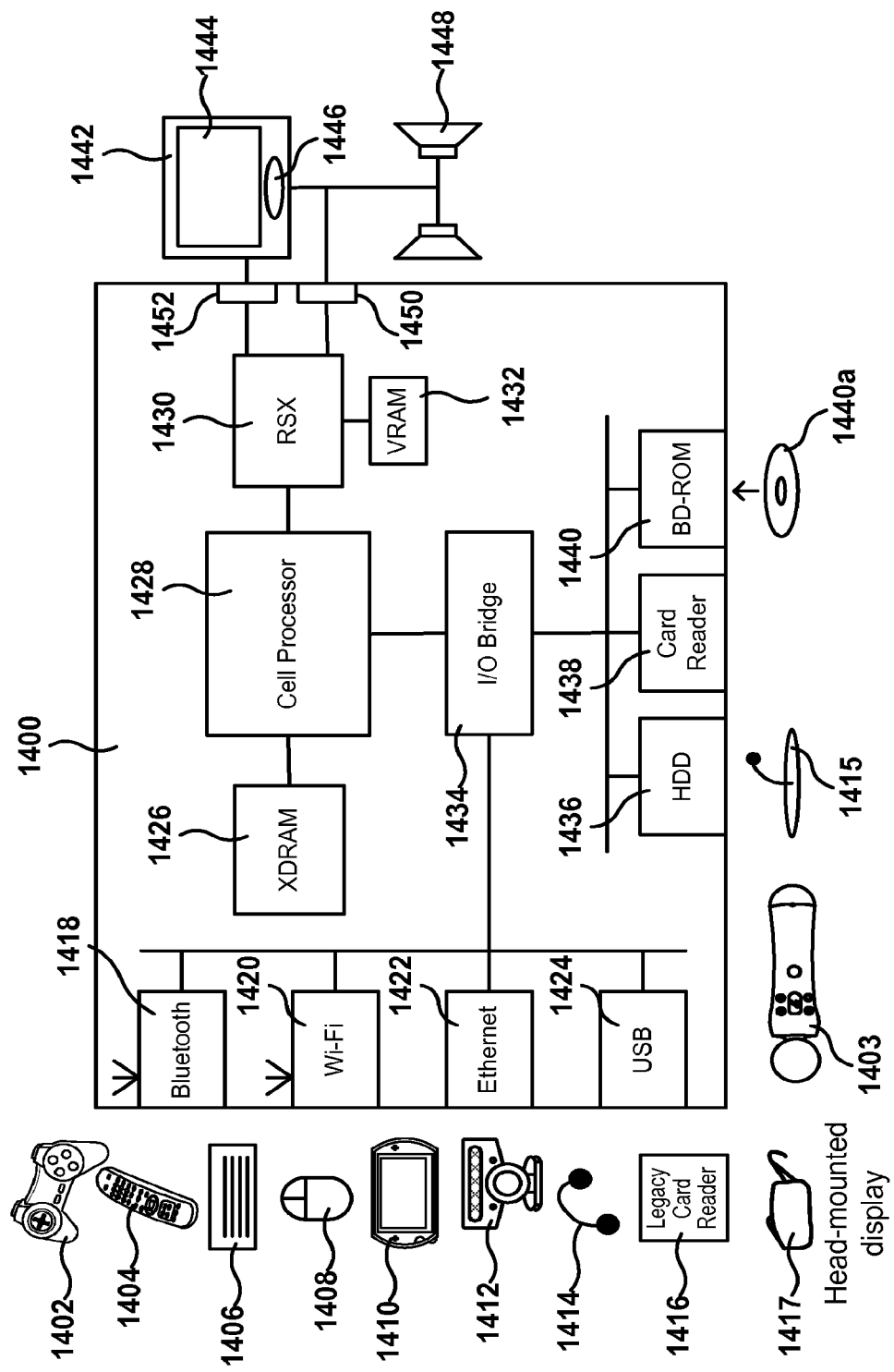
FIG. 10 illustrates hardware and user interfaces that may be used to implement embodiments of the invention.

FIG. 10 illustrates hardware and user interfaces that may be used to implement embodiments of the invention. FIG. 10 schematically illustrates the overall system architecture of the Sony® PlayStation® 3 entertainment device. A system unit 1400 is provided, with various peripheral devices connectable to the system unit 1400. The system unit 1400 comprises: a Cell processor 1428; a Rambus® dynamic random access memory (XDRAM) unit 1426; a Reality Synthesizer graphics unit 1430 with a dedicated video random access memory (VRAM) unit 1432; and an I/O bridge 1434. The system unit 1400 also comprises a Blu-ray® Disk BD-ROM® optical disk reader 1440 for reading from a disk 1440a and a removable slot-in hard disk drive (HDD) 1436, accessible through the I/O bridge 1434. Optionally the system unit 1400 also comprises a memory card reader 1438 for reading compact flash memory cards, Memory Stick® memory cards and the like, which is similarly accessible through the I/O bridge 1434.

The I/O bridge 1434 also connects to six Universal Serial Bus (USB) 2.0 ports 1424; a gigabit Ethernet port 1422; an IEEE 802.11b/g wireless network (Wi-Fi) port 1420; and a Bluetooth® wireless link port 1418 capable of supporting of up to seven Bluetooth connections.

The wireless, USB and Ethernet ports also provide connectivity for other peripheral devices in addition to game controllers 1402-1403 and HMD 1417, such as: a remote control 1404; a keyboard 1406; a mouse 1408; a portable entertainment device 1410 such as a Sony PSP® entertainment device; a video camera such as a PlayStation® Eye Camera 1412; headphones 1414; and a microphone 1415. Such peripheral devices may therefore in principle be connected to the system unit 1400 wirelessly; for example the portable entertainment device 1410 may communicate via a Wi-Fi ad-hoc connection, while the headphones 1414 may communicate via a Bluetooth link.

The game controllers 1402-1403 are operable to communicate wirelessly with the system unit 1400 via the Bluetooth link, or to be connected to a USB port, thereby also providing power by which to charge the battery of the game controllers 1402-1403. Game controller 1402 is a controller designed to be used with two hands, and game controller 1403 is a single-hand controller with a ball attachment. In addition to one or more analog joysticks and conventional control buttons, the game controller is susceptible to three-dimensional location determination. Consequently gestures and movements by the user of the game controller may be translated as inputs to a game in addition to or instead of conventional button or joystick commands.

In one embodiment, voice and gaze inputs are utilized to play sound toward specific audio speakers according to the Point of Gaze (POG) of the user. The audio connectors 1450 may include conventional analogue and digital outputs whilst the video connectors 1452 may variously include component video, S-video, composite video and one or more High Definition Multimedia Interface (HDMI) outputs. Consequently, video output may be in formats such as PAL or NTSC, or in 720p, 1080i or 1080p high definition.

Figure 11:
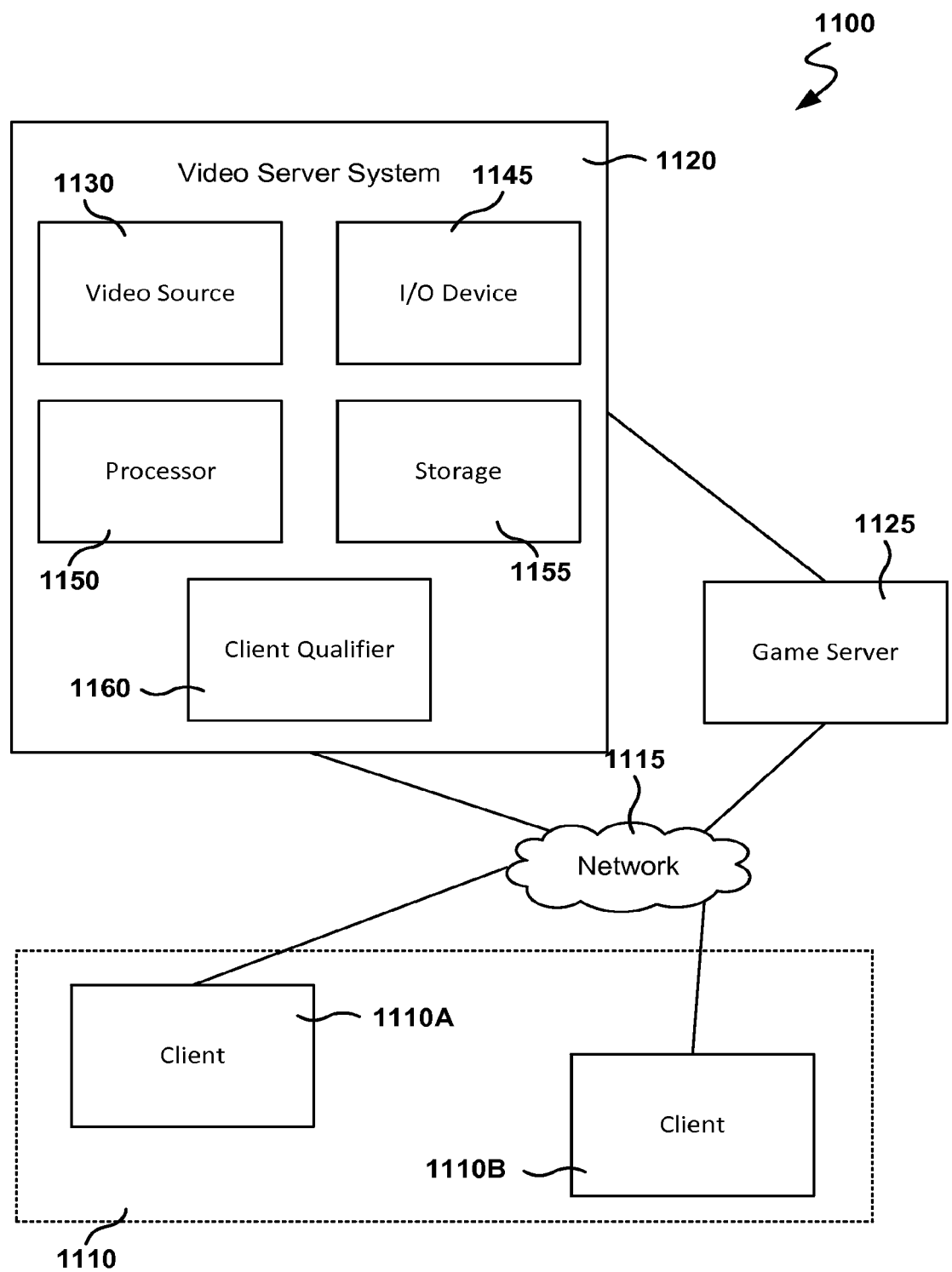
FIG. 11 is a block diagram of a game system, according to various embodiments of the invention.

FIG. 11 is a block diagram of a Game System 1100, according to various embodiments of the invention. Game System 1100 is configured to provide a video stream to one or more Clients 1110 via a Network 1115. Game System 1100 typically includes a Video Server System 1120 and an optional game server 1125. Video Server System 1120 is configured to provide the video stream to the one or more Clients 1110 with a minimal quality of service. For example, Video Server System 1120 may receive a game command that changes the state of or a point of view within a video game, and provide Clients 1110 with an updated video stream reflecting this change in state with minimal lag time. The Video Server System 1120 may be configured to provide the video stream in a wide variety of alternative video formats.

Clients 1110, referred to herein individually as 1110A., 1110B., etc., may include head mounted displays, terminals, personal computers, game consoles, tablet computers, telephones, set top boxes, kiosks, wireless devices, digital pads, stand-alone devices, handheld game playing devices, and/or the like. Typically, Clients 1110 are configured to receive encoded video streams, decode the video streams, and present the resulting video to a user, e.g., a player of a game. The processes of receiving encoded video streams and/or decoding the video streams typically includes storing individual video frames in a receive buffer of the client. The video streams may be presented to the user on a display integral to Client 1110 or on a separate device such as a monitor or television. Clients 1110 are optionally configured to support more than one game player. For example, a game console may be configured to support two, three, four or more simultaneous players. Each of these players may receive a separate video stream, or a single video stream may include regions of a frame generated specifically for each player, e.g., generated based on each player's point of view. Clients 1110 are optionally geographically dispersed. The number of clients included in Game System 1100 may vary widely from one or two to thousands, tens of thousands, or more. As used herein, the term "game player" is used to refer to a person that plays a game and the term "game playing device" is used to refer to a device used to play a game. In some embodiments, the game playing device may refer to a plurality of computing devices that cooperate to deliver a game experience to the user. For example, a game console and an HMD may cooperate with the video server system 1120 to deliver a game viewed through the HMD. In one embodiment, the game console receives the video stream from the video server system 1120, and the game console forwards the video stream, or updates to the video stream, to the HMD for rendering.

Clients 1110 are configured to receive video streams via Network 1115. Network 1115 may be any type of communication network including, a telephone network, the Internet, wireless networks, powerline networks, local area networks, wide area networks, private networks, and/or the like. In typical embodiments, the video streams are communicated via standard protocols, such as TCP/IP or UDP/IP. Alternatively, the video streams are communicated via proprietary standards.

A typical example of Clients 1110 is a personal computer comprising a processor, non-volatile memory, a display, decoding logic, network communication capabilities, and input devices. The decoding logic may include hardware, firmware, and/or software stored on a computer readable medium. Systems for decoding (and encoding) video streams are well known in the art and vary depending on the particular encoding scheme used.

Clients 1110 may, but are not required to, further include systems configured for modifying received video. For example, a client may be configured to perform further rendering, to overlay one video image on another video image, to crop a video image, and/or the like. For example, Clients 1110 may be configured to receive various types of video frames, such as I-frames, P-frames and B-frames, and to process these frames into images for display to a user. In some embodiments, a member of Clients 1110 is configured to perform further rendering, shading, conversion to 3-D, optical distortion processing for HMD optics, or like operations on the video stream. A member of Clients 1110 is optionally configured to receive more than one audio or video stream. Input devices of Clients 1110 may include, for example, a one-hand game controller, a two-hand game controller, a gesture recognition system, a gaze recognition system, a voice recognition system, a keyboard, a joystick, a pointing device, a force feedback device, a motion and/or location sensing device, a mouse, a touch screen, a neural interface, a camera, input devices yet to be developed, and/or the like.

The video stream (and optionally audio stream) received by Clients 1110 is generated and provided by Video Server System 1120. As is described further elsewhere herein, this video stream includes video frames (and the audio stream includes audio frames). The video frames are configured (e.g., they include pixel information in an appropriate data structure) to contribute meaningfully to the images displayed to the user. As used herein, the term "video frames" is used to refer to frames including predominantly information that is configured to contribute to, e.g. to effect, the images shown to the user. Most of the teachings herein with regard to "video frames" can also be applied to "audio frames."

Clients 1110 are typically configured to receive inputs from a user. These inputs may include game commands configured to change the state of the video game or otherwise affect game play. The game commands can be received using input devices and/or may be automatically generated by computing instructions executing on Clients 1110. The received game commands are communicated from Clients 1110 via Network 1115 to Video Server System 1120 and/or Game Server 1125. For example, in some embodiments, the game commands are communicated to Game Server 1125 via Video Server System 1120. In some embodiments, separate copies of the game commands are communicated from Clients 1110 to Game Server 1125 and Video Server System 1120. The communication of game commands is optionally dependent on the identity of the command. Game commands are optionally communicated from Client 1110A through a different route or communication channel that that used to provide audio or video streams to Client 1110A.

Game Server 1125 is optionally operated by a different entity than Video Server System 1120. For example, Game Server 1125 may be operated by the publisher of a multi-player game. In this example, Video Server System 1120 is optionally viewed as a client by Game Server 1125 and optionally configured to appear from the point of view of Game Server 1125 to be a prior art client executing a prior art game engine. Communication between Video Server System 1120 and Game Server 1125 optionally occurs via Network 1115. As such, Game Server 1125 can be a prior art multiplayer game server that sends game state information to multiple clients, one of which is game server system 1120. Video Server System 1120 may be configured to communicate with multiple instances of Game Server 1125 at the same time. For example, Video Server System 1120 can be configured to provide a plurality of different video games to different users. Each of these different video games may be supported by a different Game Server 1125 and/or published by different entities. In some embodiments, several geographically distributed instances of Video Server System 1120 are configured to provide game video to a plurality of different users. Each of these instances of Video Server System 1120 may be in communication with the same instance of Game Server 1125. Communication between Video Server System 1120 and one or more Game Server 1125 optionally occurs via a dedicated communication channel. For example, Video Server System 1120 may be connected to Game Server 1125 via a high bandwidth channel that is dedicated to communication between these two systems.

Video Server System 1120 comprises at least a Video Source 1130, an I/O Device 1145, a Processor 1150, and non-transitory Storage 1155. Video Server System 1120 may include one computing device or be distributed among a plurality of computing devices. These computing devices are optionally connected via a communications system such as a local area network.

Video Source 1130 is configured to provide a video stream, e.g., streaming video or a series of video frames that form a moving picture. In some embodiments, Video Source 1130 includes a video game engine and rendering logic. The video game engine is configured to receive game commands from a player and to maintain a copy of the state of the video game based on the received commands. This game state includes the position of objects in a game environment, as well as typically a point of view. The game state may also include properties, images, colors and/or textures of objects. The game state is typically maintained based on game rules, as well as game commands such as move, turn, attack, set focus to, interact, use, and/or the like. Part of the game engine is optionally disposed within Game Server 1125. Game Server 1125 may maintain a copy of the state of the game based on game commands received from multiple players using geographically disperse clients. In these cases, the game state is provided by Game Server 1125 to Video Source 1130, wherein a copy of the game state is stored and rendering is performed. Game Server 1125 may receive game commands directly from Clients 1110 via Network 1115, and/or may receive game commands via Video Server System 1120.

Video Source 1130 typically includes rendering logic, e.g., hardware, firmware, and/or software stored on a computer readable medium such as Storage 1155. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients 1110. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and a "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In alternative embodiments Video Source 1130 includes a video recording device such as a camera. This camera may be used to generate delayed or live video that can be included in the video stream of a computer game. The resulting video stream, optionally includes both rendered images and images recorded using a still or video camera. Video Source 1130 may also include storage devices configured to store previously recorded video to be included in a video stream. Video Source 1130 may also include motion or positioning sensing devices configured to detect motion or position of an object, e.g., person, and logic configured to determine a game state or produce video-based on the detected motion and/or position.

Video Source 1130 is optionally configured to provide overlays configured to be placed on other video. For example, these overlays may include a command interface, log in instructions, messages to a game player, images of other game players, video feeds of other game players (e.g., webcam video). In embodiments of Client 1110A including a touch screen interface or a gaze detection interface, the overlay may include a virtual keyboard, joystick, touch pad, and/or the like. In one example of an overlay a player's voice is overlaid on an audio stream. Video Source 1130 optionally further includes one or more audio sources.

In embodiments wherein Video Server System 1120 is configured to maintain the game state based on input from more than one player, each player may have a different point of view comprising a position and direction of view. Video Source 1130 is optionally configured to provide a separate video stream for each player based on their point of view. Further, Video Source 1130 may be configured to provide a different frame size, frame data size, and/or encoding to each of Client 1110. Video Source 1130 is optionally configured to provide 3-D video.

I/O Device 1145 is configured for Video Server System 1120 to send and/or receive information such as video, commands, requests for information, a game state, gaze information, device motion, device location, user motion, client identities, player identities, game commands, security information, audio, and/or the like. I/O Device 1145 typically includes communication hardware such as a network card or modem. I/O Device 1145 is configured to communicate with Game Server 1125, Network 1115, and/or Clients 1110.

Processor 1150 is configured to execute logic, e.g. software, included within the various components of Video Server System 1120 discussed herein. For example, Processor 1150 may be programmed with software instructions in order to perform the functions of Video Source 1130, Game Server 1125, and/or a Client Qualifier 1160. Video Server System 1120 optionally includes more than one instance of Processor 1150. Processor 1150 may also be programmed with software instructions in order to execute commands received by Video Server System 1120, or to coordinate the operation of the various elements of Game System 1100 discussed herein. Processor 1150 may include one or more hardware device. Processor 1150 is an electronic processor.

Storage 1155 includes non-transitory analog and/or digital storage devices. For example, Storage 1155 may include an analog storage device configured to store video frames. Storage 1155 may include a computer readable digital storage, e.g. a hard drive, an optical drive, or solid state storage. Storage 1115 is configured (e.g. by way of an appropriate data structure or file system) to store video frames, artificial frames, a video stream including both video frames and artificial frames, audio frame, an audio stream, and/or the like. Storage 1155 is optionally distributed among a plurality of devices. In some embodiments, Storage 1155 is configured to store the software components of Video Source 1130 discussed elsewhere herein. These components may be stored in a format ready to be provisioned when needed.

Video Server System 1120 optionally further comprises Client Qualifier 1160. Client Qualifier 1160 is configured for remotely determining the capabilities of a client, such as Clients 1110A or 1110B. These capabilities can include both the capabilities of Client 1110A itself as well as the capabilities of one or more communication channels between Client 1110A and Video Server System 1120. For example, Client Qualifier 1160 may be configured to test a communication channel through Network 1115.

Client Qualifier 1160 can determine (e.g., discover) the capabilities of Client 1110A manually or automatically. Manual determination includes communicating with a user of Client 1110A and asking the user to provide capabilities. For example, in some embodiments, Client Qualifier 1160 is configured to display images, text, and/or the like within a browser of Client 1110A. In one embodiment, Client 1110A is an HMD that includes a browser. In another embodiment, client 1110A is a game console having a browser, which may be displayed on the HMD. The displayed objects request that the user enter information such as operating system, processor, video decoder type, type of network connection, display resolution, etc. of Client 1110A. The information entered by the user is communicated back to Client Qualifier 1160.

Automatic determination may occur, for example, by execution of an agent on Client 1110A and/or by sending test video to Client 1110A. The agent may comprise computing instructions, such as java script, embedded in a web page or installed as an add-on. The agent is optionally provided by Client Qualifier 1160. In various embodiments, the agent can find out processing power of Client 1110A, decoding and display capabilities of Client 1110A, lag time reliability and bandwidth of communication channels between Client 1110A and Video Server System 1120, a display type of Client 1110A, firewalls present on Client 1110A, hardware of Client 1110A, software executing on Client 1110A, registry entries within Client 1110A, and/or the like.

Client Qualifier 1160 includes hardware, firmware, and/or software stored on a computer readable medium. Client Qualifier 1160 is optionally disposed on a computing device separate from one or more other elements of Video Server System 1120. For example, in some embodiments, Client Qualifier 1160 is configured to determine the characteristics of communication channels between Clients 1110 and more than one instance of Video Server System 1120. In these embodiments the information discovered by Client Qualifier can be used to determine which instance of Video Server System 1120 is best suited for delivery of streaming video to one of Clients 1110.

Embodiments of the present invention may be practiced with various computer system configurations including hand-held devices, microprocessor systems, microprocessor-based or programmable consumer electronics, minicomputers, mainframe computers and the like. The embodiments can also be practiced in distributed computing environments where tasks are performed by remote processing devices that are linked through a network.

With the above embodiments in mind, it should be understood that the embodiments can employ various computer-implemented operations involving data stored in computer systems. These operations are those requiring physical manipulation of physical quantities. Any of the operations described herein that form part of the embodiments are useful machine operations. The embodiments also relate to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. When data is obtained over a network the data may be processed by other computers on the network, e.g., a cloud of computing resources.

One or more embodiments of the present invention can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for rendering images on a display of a head mounted display (HMD), comprising:
    tracking, with a gaze detection module inside the HMD, a gaze of a user of the HMD for generating gaze data;
    predicting, based on the gaze data, that the gaze of the user is to be directed toward a first region of the display of the HMD at a future time; and
    rendering the first region of the display with a higher image quality than regions away from the first region before the gaze of the user arrives at the first region.

2. The method of claim 1, wherein the tracking the gaze of the user includes tracking movements of eyes of the user, and wherein the gaze data includes data related the movements of the eyes of the user.

3. The method of claim 1, wherein the gaze data is usable to calculate a trajectory of the gaze.

4. The method of claim 3, wherein at least part of the trajectory of the gaze is usable for the predicting that the gaze of the user is to be directed toward the first region of the display of the HMD at the future time.

5. The method of claim 1, further comprising:
    determining that a virtual object is to be displayed in the first region;
    wherein the predicting that the gaze of the user is to be directed toward the first region is further based on said determining that the virtual object is to be displayed in the first region.

6. The method of claim 1, wherein the gaze detection module includes one or more cameras, the one or more cameras are configured to capture movements of eyes of the user.

7. The method of claim 1, further comprising:
    tracking motion data of the HMD;
    wherein the predicting that the gaze of the user is to be directed toward the first region is further based on the tracking of the motion data of the HMD.

8. The method of claim 1, wherein the first region demarcates an area of the display for the higher image quality.

9. The method of claim 8, wherein the regions away from the first region define portions of the display that are not included within the area demarcated by the first region, the portions of the display that are not included within the area demarcated by the first region are rendered with a lower image quality.

10. The method of claim 1, wherein image quality is defined by one or more of a resolution, or a complexity of rendering imagery, or a scanning out rate, or a screen update frequency.

11. A method for rendering images on a display of a head mounted display (HMD), comprising:
    tracking, with a gaze detection module, a gaze of a user of the HMD for generating gaze data;
    accessing importance values for a plurality of virtual objects to be displayed by the HMD;
    predicting, based on the gaze data and based on the importance values for the plurality of virtual objects, that the gaze of the user is to be directed toward a first region of the display at a future time;
    assigning rendering priority values for the plurality of virtual objects based on a proximity between each of the plurality of virtual objects and the first region; and
    rendering, by the HMD, the plurality of virtual objects to the display according to the rendering priority values before the gaze of the user arrives at the first region.

12. The method of claim 11, wherein virtual objects that are more proximal to the first region are assigned higher rendering priority values than virtual objects that are less proximal to the first region.

13. The method of claim 11, wherein the tracking the gaze of the user includes tracking movements of eyes of the user, and wherein the gaze data is related to the movements of the eyes of the user.

14. The method of claim 11, wherein the at least part of the gaze data is usable to calculate a trajectory of the gaze, and wherein the trajectory of the gaze is usable for said predicting that the gaze of the user is to be directed toward the first region of the display at the future time.

15. The method of claim 11, wherein the gaze detection module includes one or more cameras for capturing movements of eyes of the user for said generating the gaze data.

16. The method of claim 11, further comprising:
    tracking motion data of the HMD;
    wherein the predicting that the gaze of the user is to be directed toward the first region of the display at the future time is further based on the tracking of the motion data of the HMD.

17. The method of claim 11, wherein the rendering priority values define one or more of a frequency of rendering, or a complexity of rendering, or an image quality, or a resolution.

18. A computer program embedded in a non-transitory computer-readable storage medium, when executed by one or more processors for rendering images on a display of a head mounted display (HMD), the computer program comprising:
- program instructions for tracking, with a gaze detection module inside the HMD, a gaze of a user for generating gaze data, the tracking the gaze includes tracking movements of eyes of the user;
- program instructions for predicting, based on the gaze data, that the gaze of the user is to be directed toward a first region of the display of the HMD at a future time; and
- program instructions for rendering the first region of the display with an image quality that is greater than that of regions away from the first region before the gaze of the user arrives at the first region.

19. The computer program as recited in claim 18, further comprising:
- program instructions for accessing an importance value of a virtual object that is to be displayed within the first region;
- wherein predicting that the gaze of the user is to be directed toward the first region of the display at a future time is further based on the importance value of the virtual object that is to be displayed within the first region.

20. The computer program as recited in claim 18, wherein the first region demarcates an area of the display for the higher image quality.

21. The computer program as recited in claim 20, wherein the regions away from the first region defined portions of the display that are not included within the area demarcated by the first region, the portions of the display not includes within the area demarcated by the first region are rendered with a lower image quality.

22. The computer program as recited in claim 20, wherein the image quality is defined by one or more of a resolution, or a complexity of imagery, or a scanning out rate, or a screen update frequency.

\* \* \* \* \*